United States Patent Office 3,497,819
Patented Feb. 24, 1970

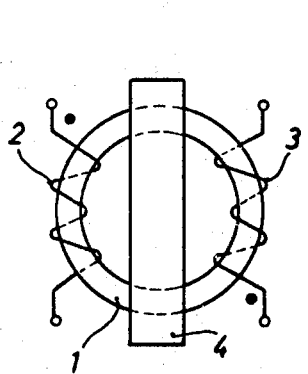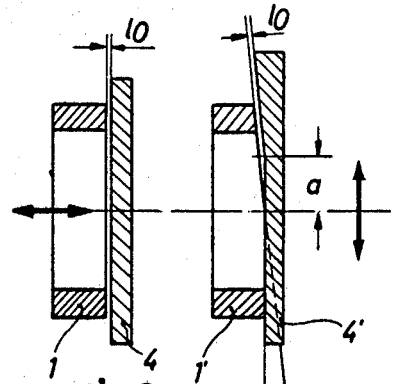
Fig.1   Fig.2   Fig.3
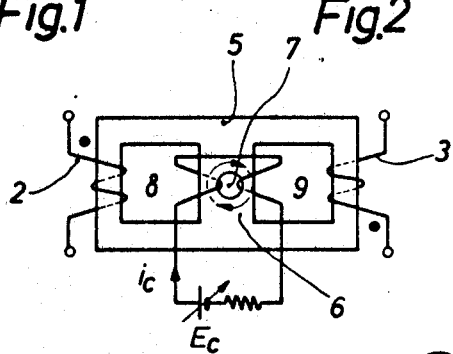
Fig.4
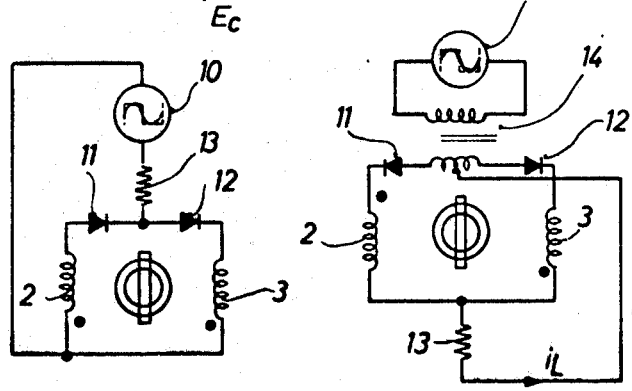
Fig.5   Fig.6
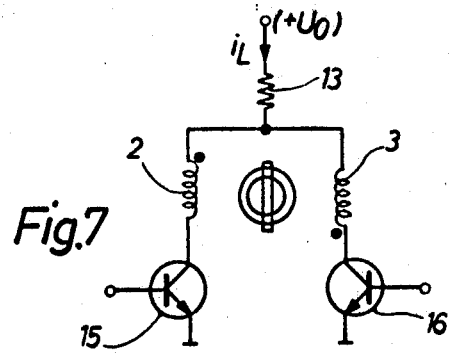
Fig.7   Fig.8
INVENTOR.
HORST MICHAELIS
BY
AGENT

3,497,819
MAGNETIC AMPLIFIER OF THE KIND HAVING A CONTROLLABLE SHUNT
Horst Michaelis, Quickborn, Germany, assignor, by mesne assignments, to U.S. Philips Corporation, New York, N.Y., a corporation of Delaware
Filed Apr. 21, 1966, Ser. No. 544,185
Int. Cl. H03f 9/00
U.S. Cl. 330—8                                6 Claims

ABSTRACT OF THE DISCLOSURE

A magnetic device comprising a core of square loop magnetic material arranged to form a closed magnetic circuit having a pair of windings thereon. A magnetic shunt is arranged adjacent the core to form an air gap therewith. The windings are alternately energized for equal periods so as to alternately magnetize the closed magnetic circuit in opposite directions. The shunt is movable to vary the air gap and the device produces a corresponding electric signal variation. The device can operate as a sensitive electromechanical transducer.

---

The present invention relates to a magnetic amplifier which can be controlled by a current or by very small mechanical motions of a magnetic shunt.

In magnetic amplifiers of known type there are two magnetic main circuits that are usually controlled directly. A magnetic amplifier according to the invention is distinguished from the known amplifiers by a considerably higher sensitivity and, moreover, by a particularly simple structure.

These advantages are obtained, in accordance with the invention, by forming a magnetically closed circuit from a material having a rectangular hysteresis loop. In parallel with two limbs of the circuit, on which windings are provided in known manner, a controllable magnetic shunt is arranged. Voltages are alternately applied to the winding for equal periods so that the magnetically closed circuit is magnetised alternately in opposite directions.

The magnetic shunt is preferably formed by a plate of weak-magnetic material, which is arranged at a variable distance from the closed magnetic circuit. This apparatus makes a very effective electromechanical transducer for converting small movements into a corresponding electric signal. As an alternative, the magnetic shunt may be arranged at a fixed distance from the circuit or in direct contact therewith, the reluctance being varied by controlling the current passing through a control winding provided on the shunt.

An object of the invention is to provide an electromechanical transducer for converting the movement of a magnetic shunt with respect to a closed magnetic circuit into an electric signal.

The invention will be described more fully with reference to the drawing, in which:

FIG. 1 shows one embodiment of the invention having an annular core and a shunt arranged thereon, the distance between the shunt and the core being variable.

FIG. 2 is a side elevation of the device shown in FIG. 1, in which the movement produced by the control is performed in a horizontal direction.

FIG. 3 shows the same device in which the movement produced by the control is performed in a vertical direction.

FIG. 4 shows a further embodiment of the invention having a stationary, electrically controllable shunt.

FIGS. 5 to 7 show various embodiments of circuit arrangements for driving the devices according to the invention.

FIG. 8 illustrates the current as a function of time.

FIGS. 1 and 2 shows an annular core 1 composed of a magnetic material having a rectangular hysteresis loop and provided with two windings 2 and 3. A plate 4, preferably of weak-magnetic ferrite material, serves as a magnetic shunt. The distance between the annular core 1 and the plate 4 is designated by $l_0$ and the overall length of the air gap of the shunt is $2l_0$. The plate and the annular core are adapted to move in a horizontal direction relative to each other.

FIG. 3 shows a similar device in which the parts 1' and and 4' are bevelled at an angle $\alpha$ so that a relative movement in a vertical direction across the distance $a$ reduces the air gap $l_0 \approx \alpha \cdot a$. This construction is advantageous where the movement covers distances exceeding approximately $10\mu$.

FIG. 4 shows an embodiment in which the magnetic shunt is controlled by controlling the effective section of the shunt. A plate 5 of magnetic ferrite material having a rectangular hysteresis loop has three limbs. The limb 6 serves as a shunt and is provided at the centre with a hole 7. The two control windings 8 and 9 are traversed by a control current $i_c$, which is controlled by means of a control voltage $E_c$. In this way, a control flux is produced around said hole, for example, a dextrorotatory flux, which varies the effective section of the limb 6. The limb 6 operates as a shunt by means of saturation effects.

FIGS. 5 to 7 show embodiments of circuit arrangements suitable for driving the magnetic amplifier according to the invention. FIGS. 5 and 6 show a generator 10 for producing a sinusoidal or square wave alternating current. The two diodes 11 and 12 ensure that the load current $i_L$ passes alternately through the windings 2 and 3 so that in the arrangement shown in FIG. 5, the load resistor 13 is traversed by an alternating current, and in the arrangement shown in FIG. 6, resistor 13 is traversed by a rectified current. The arrangement shown in FIG. 6 requires an additional transformer 14.

The arrangement of FIG. 7 comprises two control transistors 15 and 16, which are alternately conducting so that in this arrangement the load current is a rectified current.

FIG. 8 shows the variation of the rectified load current as a function of time. At a given value of the predetermined length of the air gap or of the current on which the control current is superimposed, the load current as a function of time is represented by the broken curve. If $l_0$ or $i_c$ is increased, the rise of $i_L$ starts later. If $i_0$ or $i_c$ is decreased, the rise of $i_L$ starts earlier. The current $i_c$ finally attains the value $U_0/R_L$. The average load current $I_L = \bar{i}_L$ follows directly a variation of the distance $l_0$ or of the control current $i_c$.

The operation of the device is based on the fact that the variable magnetic shunt passes a controllable portion of the magnetic flux alternately produced across the windings 2 and 3, so that for an increase in $l_0$ or $i_c$, the magnetic flux passed through the shunt is decreased, so that the load current $i_L$ rises gradually sooner to the value $U_0/R_L$. Since the hysteresis of the closed magnetic circuit is not perfectly rectangular not only two stable final states corresponding to $I_{Lmin}$ and $I_{Lmax}$ are possible, but also in accordance with the size of the magnetic shunt all intermediate states.

The magnetic amplifier according to the invention is appropriate for mechanical control and may advantageously be employed where small distance variations have to be converted into amplified electric signals. Examples thereof are pick-ups for records and other information carriers, microphones, pick-ups for measuring displacements, stretching, roughness and other values.

As a matter of fact, the magnetic amplifier can be used as a stereogramophone-pick-up or as a stereo microphone by suitable choice of the construction.

What is claimed is:

1. A transducer comprising a core of square loop magnetic material arranged to form a closed magnetic circuit having two limbs, a pair of windings on said limbs, a magnetic shunt arranged adjacent said core to form an air gap therewith, said core and shunt being relatively movable to vary said air gap, a source of alternating voltage, and means coupling said voltage source to said pair of windings so as to alternately energize said windings for equal periods thereby to alternately magnetize the closed magnetic circuit in opposite directions.

2. A transducer as claimed in claim 1 wherein said shunt comprises a plate of soft magnetic material that is movable and said core is fixed in position.

3. A transducer as claimed in claim 1 wherein said shunt comprises a plate of soft magnetic ferrite material.

4. A transducer as claimed in claim 1 wherein the facing parts of the shunt and the core are bevelled so that a relatively parallel movement thereof will vary the size of the air gap therebetween.

5. A transducer as claimed in claim 1 wherein said coupling means comprises a pair of diodes connected in individual series circuits with respective ones of said pair of windings and with said source of alternating voltage and a load element.

6. A magnetic device comprising, a core of magnetic material having a rectangular hysteresis loop and arranged to form a closed loop magnetic circuit, a pair of windings spaced apart on said core, a leg of saturable magnetic material extending across said loop between said windings to form a pair of magnetic paths linking respective ones of said windings, said leg having an aperture therein, winding means threading said aperture so as to set up a circular flux path around said aperture when a current flows in said winding means, a source of electric current coupled to said winding means, and means for alternately applying a voltage to said pair of windings for equal periods so as to alternately magnetize the closed magnetic circuit in opposite directions.

References Cited

UNITED STATES PATENTS

| 2,417,622 | 3/1947 | Walsh | 321—43 |
| 2,444,726 | 7/1948 | Bussey | 330—8 X |
| 3,076,137 | 1/1963 | Moore | 323—89 |
| 2,923,923 | 2/1960 | Raker | 323—89 X |

NATHAN KAUFMAN, Primary Examiner

U.S. Cl. X.R.

330—3; 323—89